US007660209B2

(12) United States Patent
Watanabe et al.

(10) Patent No.: US 7,660,209 B2
(45) Date of Patent: Feb. 9, 2010

(54) OPTICAL DISK DRIVE

(75) Inventors: Katsuya Watanabe, Nara (JP); Junichi Minamino, Nara (JP); Hiroshige Ishibashi, Toyonaka (JP); Takeshi Shimamoto, Moriguchi (JP)

(73) Assignee: Panasonic Corporation, Kadoma (JP)

( * ) Notice: Subject to any disclaimer, the term of this patent is extended or adjusted under 35 U.S.C. 154(b) by 687 days.

(21) Appl. No.: 11/271,054

(22) Filed: Nov. 11, 2005

(65) Prior Publication Data

US 2006/0114795 A1 Jun. 1, 2006

(30) Foreign Application Priority Data

Nov. 12, 2004 (JP) ............................ 2004-328745

(51) Int. Cl.
*G11B 7/00* (2006.01)

(52) U.S. Cl. ............... 369/44.26; 369/47.28; 369/44.28

(58) Field of Classification Search .................. 369/32, 369/33, 43, 44.25–44.26, 44.28–44.29, 44.35, 369/47.28, 54, 55, 58
See application file for complete search history.

(56) References Cited

U.S. PATENT DOCUMENTS

| | | | | |
|---|---|---|---|---|
| 5,050,146 A * | 9/1991 | Richgels et al. | .......... | 369/30.15 |
| 5,872,750 A * | 2/1999 | Satoh | ...................... | 369/30.22 |
| 5,991,258 A * | 11/1999 | Morita et al. | ............ | 369/275.4 |
| 6,054,199 A * | 4/2000 | Sugiyama et al. | .......... | 428/64.1 |
| 6,631,114 B1 * | 10/2003 | Kobayashi | ............... | 369/275.4 |
| 7,057,985 B1 * | 6/2006 | Kobayashi et al. | ....... | 369/47.28 |
| 2002/0150017 A1 | 10/2002 | Ono et al. | ................ | 369/53.23 |
| 2003/0095481 A1 | 5/2003 | Williams et al. | ......... | 369/47.28 |

FOREIGN PATENT DOCUMENTS

| | | | |
|---|---|---|---|
| JP | 11-296911 | | 10/1999 |
| JP | 2001-118244 | | 4/2001 |
| JP | 2001-266358 | | 9/2001 |
| JP | 2002-083432 | * | 3/2002 |
| TW | 470949 | | 1/1991 |

OTHER PUBLICATIONS

Notice of Allowance issued on Mar. 25, 2008 for the corresponding Taiwan Patent Application No. 094139606 and partial English translation thereof.

Notice for Reasons for Rejection in corresponding Japanese Application No. 2005-323240 dated May 13, 2008 and English Translation.

* cited by examiner

*Primary Examiner*—Wayne R Young
*Assistant Examiner*—LaTanya Bibbins
(74) *Attorney, Agent, or Firm*—Renner, Otto, Boisselle & Sklar, LLP

(57) ABSTRACT

An optical disk drive is designed to read and/or write data from/on a spiral string of tracks where land and groove tracks are alternated. The drive includes: a light source for radiating a light beam; a lens for converging the light beam; a mechanism for moving the lens; a photodetector for generating an electrical signal based on at least a part of the light beam reflected from the optical disk; and a control section for controlling the light source and the mechanism responsive to the electrical signal. While performing a seek operation by having the lens moved by the mechanism such that a target track, from/on which the data should start being read or written, is irradiated with the light beam, the control section tries to get a PLL locked by irradiating another track, which precedes the target track by at least one, with the light beam.

9 Claims, 11 Drawing Sheets

OPTICAL DISK DRIVE

BACKGROUND OF THE INVENTION

1. Field of the Invention

The present invention relates to an optical disk drive for reading and/or writing data from/on an optical disk.

2. Description of the Related Art

In optical disk technologies, data or information can be read out from a rotating optical disk by irradiating the disk with a relatively weak light beam with a constant intensity, and detecting the light that has been modulated by, and reflected from, the optical disk.

On a rewritable optical disk such as a DVD-RAM, a recording material film, from/on which data can be read and written optically, is deposited by an evaporation process, for example, on the surface of a substrate on which tracks with spiral lands or grooves are arranged. In writing data on a DVD-RAM, the optical disk is irradiated with a light beam, of which the optical power has been changed according to the data to be written, thereby locally changing the property of the recording material film. A portion of the recording material film, which has been irradiated with the light beam, comes to have a different refractive index from that of the other portions that have not been irradiated with the light beam. Such a portion with the varied refractive index will be referred to herein as a "recording mark", while an interval between two adjacent recording marks on the same track will be referred to herein as a "space". By adjusting the lengths of these recording marks and spaces, user data can be written on the tracks.

It should be noted that the level difference between the lands and grooves and the thickness of the recording material film are smaller than the thickness of the optical disk substrate. For that reason, those portions of the optical disk, where data is stored, define a two-dimensional plane, which is sometimes called an "information storage plane". However, considering that such an "information storage plane" has a physical dimension in the depth direction, too, the term "information storage plane" will be replaced herein by another term "information storage layer". Every optical disk has at least one such information storage layer. Optionally, a single information storage layer may actually include a plurality of layers such as a phase-changeable material layer and a reflective layer.

FIGS. 1A through 1D illustrate the configuration of a DVD-RAM. Specifically, FIG. 1D schematically illustrates the track arrangement of an optical disk 100 manufactured to the specifications of a DVD-RAM. FIG. 1B is a plan view showing the area inside the dashed line in FIG. 1D on a larger scale. FIG. 1A is a cross-sectional view illustrating a half of the area shown in FIG. 1B on the left-hand side of the arrow A, while FIG. 1C is a cross-sectional view illustrating the other half of the area shown in FIG. 1B on the right-hand side of the arrow A.

As shown in FIGS. 1A through 1D, a spiral string of tracks, where land tracks and groove tracks are alternated with each other, is provided on the substrate surface of the optical disk 100. Each of those tracks has a length corresponding to one round of the optical disk. At the position pointed by the arrow A in FIG. 1B, a groove track changes into a land track, and a land track changes into a groove track. Although not shown, an information storage layer and a protective coating have actually been deposited on the substrate surface with such level differences.

To read or write data from/on the optical disk 100, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position (or converging point) of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Suppose a light beam has been converged by an objective lens to form a beam spot on the information storage layer of the optical disk 100. More specifically, the beam spot is supposed to have been formed at the point indicated by the solid circle in FIG. 1B and the optical disk 100 is supposed to be spinning counterclockwise. In that case, as the optical disk 100 turns, the beam spot shown in FIG. 1B moves along the land track in the direction pointed by the arrow B1. And when the optical disk 100 has made one round, the light beam spot on the land track will return to the area inside the dashed line in FIG. 1B as pointed by the arrow B2. At this point in time, the beam spot is located closer to the outer edge (or the lead-out area) of the optical disk 100. As the optical disk 100 further turns, the beam spot soon passes the boundary pointed by the arrow A in FIG. 1B and moves rightward as pointed by the arrow C1. When passing the boundary, the beam spot hops from the land track to a groove track. And when the optical disk 100 has made another round, the beam spot that has been moving along the groove track as pointed by the arrow C2 will go over the boundary pointed by the arrow A. Then, the beam spot will hop from the groove track onto a land track.

In this manner, in the optical disk 100 manufactured to the specifications of a DVD-RAM, data is read and written from/on both land tracks and groove tracks. On the optical disk 100, the alternated land and groove tracks are arranged spirally and the changing point between the land and groove tracks is defined by the boundary pointed by the arrow A.

As described above, every time the optical disk 100 makes one round, the beam spot shifts one track closer to the outer edge of the disk. That is why to keep the beam spot located on the same track for a long time while turning the optical disk 100, every time the optical disk 100 makes one round, the beam spot location needs to be shifted one track closer to the inner edge of the disk. Such an operation is called a "still jump" or a "retrace jump".

FIG. 2A is a cross-sectional view schematically illustrating how a light beam has been converged by an objective lens on a land track of the optical disk 100. FIG. 2B is a plan view illustrating a portion of land/groove tracks. As shown in FIG. 2B, the land/groove tracks wobble in a predetermined period. Such wobbling modulates the intensity of a read signal in a relatively long period. When a low pass filter extracts a periodic variation caused by the wobbling from the read signal, a wobble detection signal can be generated. The period of the wobble detection signal corresponds to the wobbling period of the land/groove tracks on the optical disk 100, and may be used as a reference for a clock signal. More particularly, the wobble of the tracks on the optical disk 100 is defined such that frequency and phase are fixed with respect to header data. Accordingly, if a phase-locked loop (PLL) control is carried out, and the oscillation frequency of a voltage controlled oscillator (VCO) is regulated, by reference to the wobble detection signal, a reference signal can be generated as a timing signal that is required to read the header data. An optical disk with such wobbling tracks is disclosed in Japanese Patent Application Laid-Open Publications Nos. 2001-266358 and 11-296911.

Due to the difference in cross-sectional shape as shown in FIG. 2A, a land track and a groove track exhibit mutually different read/write characteristics. Thus, in the prior art, to resolve such a difference in the read/write characteristics exhibited by land and groove tracks, the ratio of the width of a land track to that of a groove track (which will be referred to herein as an "L/G ratio") is sometimes set to be not equal to one.

FIG. 3A is a plan view illustrating where recording marks are left on a land track when the L/G ratio is one. FIG. 3B is a cross-sectional view illustrating which portion of the track a light beam hits in such a situation. And FIG. 3C shows the waveform of a wobble signal that has been read from a land track with such recording marks. On the other hand, FIG. 4A is a plan view illustrating where recording marks are left on a land track when the L/G ratio is smaller than one. FIG. 4B is a cross-sectional view illustrating which portion of the track a light beam hits in such a situation. And FIG. 4C shows the waveform of a wobble signal that has been read from a land track with such recording marks.

If the L/G ratio is smaller than one (i.e., if land tracks are narrower than groove tracks), some recording mark may be left partially outside of an edge of the land track as shown in FIGS. 4A and 4B due to an off track. In that case, noise is created in the wobble signal as shown in FIG. 4C owing to the presence of such a recording mark and the wobble signal cannot be detected with good stability anymore. Then, the PLL cannot be locked as intended, which is a problem. Also, even if the PLL can be locked anyway, it should take a longer time to achieve the phase locking. Therefore, even if the PLL has been locked successfully once, the light beam spot may have gone over the target track more often than not. In such a situation, it is necessary to try to get the PLL locked all over again (which is sometimes called a "retrace operation"), thus preventing a series of data read and write operations from being started normally. Suppose the target track, from/on which data should start being read or written, is the land track on which the light beam spot is located as shown in FIG. 1B. Even if the drive starts trying to get the PLL locked on this target track, the PLL may not get locked on the same target track for the reasons described above. Then, to carry out a retrace operation, the beam spot that has moved in the direction pointed by the arrow B2 needs to jump one track back toward the inner edge of the disk such that the drive can retry to get the PLL locked on the target track. However, the target track in problem, on which the PLL could not get locked last time, may be unqualified to get the PLL locked due to the low quality of the wobble signal. In that case, the PLL still cannot be locked no matter how many times the drive retries to get the PLL locked.

SUMMARY OF THE INVENTION

In order to overcome the problems described above, a primary object of the present invention is to provide an optical disk drive that can start reading or writing data from/on any desired track quickly.

An optical disk drive according to a preferred embodiment of the present invention is designed to read and/or write data from/on a spiral string of tracks, where land tracks and groove tracks are alternated with each other. The optical disk drive preferably includes: a light source for radiating a light beam; a lens for converging the light beam; moving means for moving the lens; a photodetector for generating an electrical signal based on at least a part of the light beam that has been reflected from the optical disk; and a control section for controlling the light source and the moving means. While performing a seek operation by having the lens moved by the moving means such that a target track, where the data should start being read or written from/on the optical disk, is irradiated with the light beam, the control section tries to get a PLL locked by irradiating another track, which precedes the target track by at least one on the spiral string, with the light beam.

In one preferred embodiment of the present invention, if the control section has tried to get the PLL locked a predetermined number of times by irradiating the target track with the light beam but has failed to start reading or writing the data from/on the target track while performing the seek operation, the control section preferably tries to get the PLL locked by irradiating the previous track with the light beam.

In another preferred embodiment, after having started trying to get the PLL locked, the control section preferably follows the spiral string of tracks without making any track jump, reaches the target track, and then begins to read or write the data from/on the target track.

In this particular preferred embodiment, if a writing start point on the target track has been passed before the PLL gets locked, then the control section goes back to either the target track or another track, which precedes the target track by one, to try to get the PLL locked all over again.

In still another preferred embodiment, the optical disk may be a DVD-RAM or an HD-DVD.

An optical disk drive according to another preferred embodiment of the present invention is preferably designed to read and/or write data from/on a spiral string of tracks, where land tracks and groove tracks are alternated with each other. The optical disk drive preferably includes: a light source for radiating a light beam; a lens for converging the light beam; moving means for moving the lens; a photodetector for generating an electrical signal based on at least a part of the light beam that has been reflected from the optical disk; and a control section for controlling the light source and the moving means. While performing a seek operation by having the lens moved by the moving means such that a target track, where the data should start being read or written from/on the optical disk, is irradiated with the light beam, the control section performs the steps of: (a) if the control sections gets a PLL locked successfully while a beam spot of the light beam is located on a track other than the target track, shifting the beam spot to the target track while holding the PLL locked; and (b) reading or writing the data from/on the target track.

In one preferred embodiment of the present invention, the step (a) preferably includes shifting the beam spot to the target track by having the lens moved by the moving means toward either the center or the outer edge of the optical disk while holding the PLL locked.

A driving method according to a preferred embodiment of the present invention is a method for driving an optical disk drive, which is designed to read and/or write data from/on a spiral string of tracks, where land tracks and groove tracks are alternated with each other. The method preferably includes the steps of: performing a seek operation to irradiate a target track, where the data should start being read or written from/on the optical disk, with a light beam; trying to get a PLL locked on a previous track, which precedes the target track by at least one on the spiral string; and after having started trying to get the PLL locked on the previous track, following the spiral string of tracks without making any track jump, reaching the target track, and then beginning to read or write the data from/on the target track.

In one preferred embodiment of the present invention, the method preferably further includes the step of trying to get the PLL locked on the target track before the step of trying to get the PLL locked on the previous track is performed. If the step of trying to get the PLL locked on the target track has failed a predetermined number of times, the step of trying to get the PLL locked on the previous track is preferably carried out.

In a preferred embodiment, the optical disk drive preferably includes extracting means for extracting a wobble signal from the electrical signal, PLL means for generating a sync clock signal based on the wobble signal, and read/write means for reading or writing user data from/on the spiral string of tracks responsive to the sync clock signal.

The present invention provides a highly reliable optical disk drive that can get a PLL locked just as intended even if the given optical disk has a track generating a wobble signal with debased quality.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 1A through 1D illustrate the configuration of a DVD-RAM, wherein:

FIG. 1D schematically illustrates the track arrangement of an optical disk 100 manufactured to the specifications of a DVD-RAM;

FIG. 1B is a plan view showing the area inside the dashed line in FIG. 1D on a larger scale;

FIG. 1A is a cross-sectional view illustrating a half of the area shown in FIG. 1B on the left-hand side of the arrow A; and FIG. 1C is a cross-sectional view illustrating the other half of the area shown in FIG. 1B on the right-hand side of the arrow A.

FIG. 7 shows the waveforms of respective signals used in the first preferred embodiment of the present invention along with a schematic representation of land/groove tracks on the optical disk, wherein:

Figure 7:
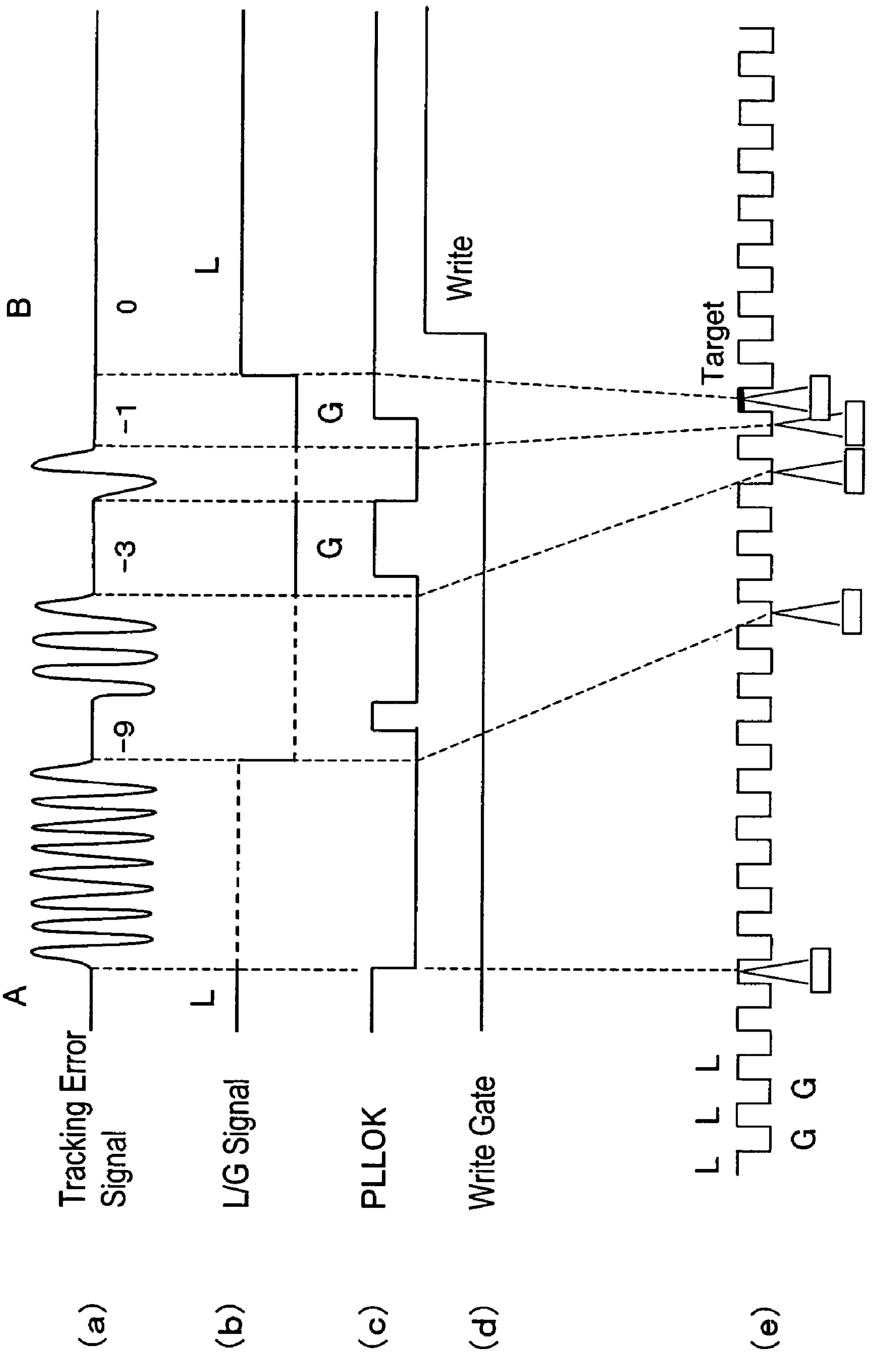

Portions (a), (b), (c) and (d) of FIG. 7 show the waveforms of a TE signal, the output signal of the L/G decision section 201 (i.e., L/G signal), a PLLOK signal indicating that the PLL has been locked, and a write gate signal representing a write state, respectively. Portion (e) of FIG. 7 schematically illustrates the unevenness created by the lands (L) and grooves (G) on the surface of the disk.

Figure 8:
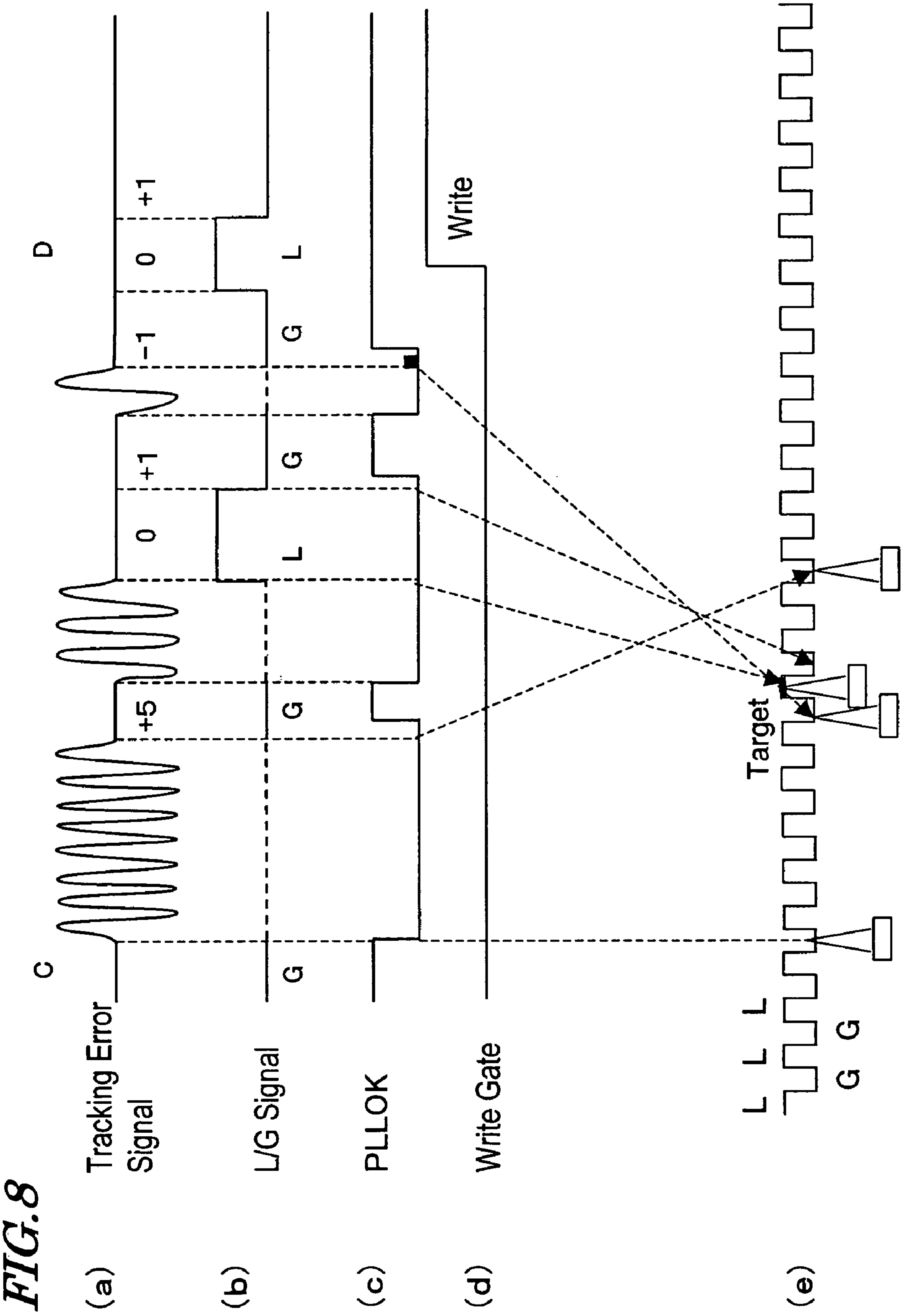

FIG. 8 shows the waveforms of respective signals used in the first preferred embodiment of the present invention along with a schematic representation of land/groove tracks on the optical disk, wherein:

Portions (a), (b), (c) and (d) of FIG. 8 show the waveforms of a TE signal, the output signal of the L/G decision section 201 (i.e., L/G signal), a PLLOK signal indicating that the PLL has been locked, and a write gate signal representing a write state, respectively. Portion (e) of FIG. 8 schematically illustrates the unevenness created by the lands (L) and grooves (G) on the surface of the disk.

Figure 9:
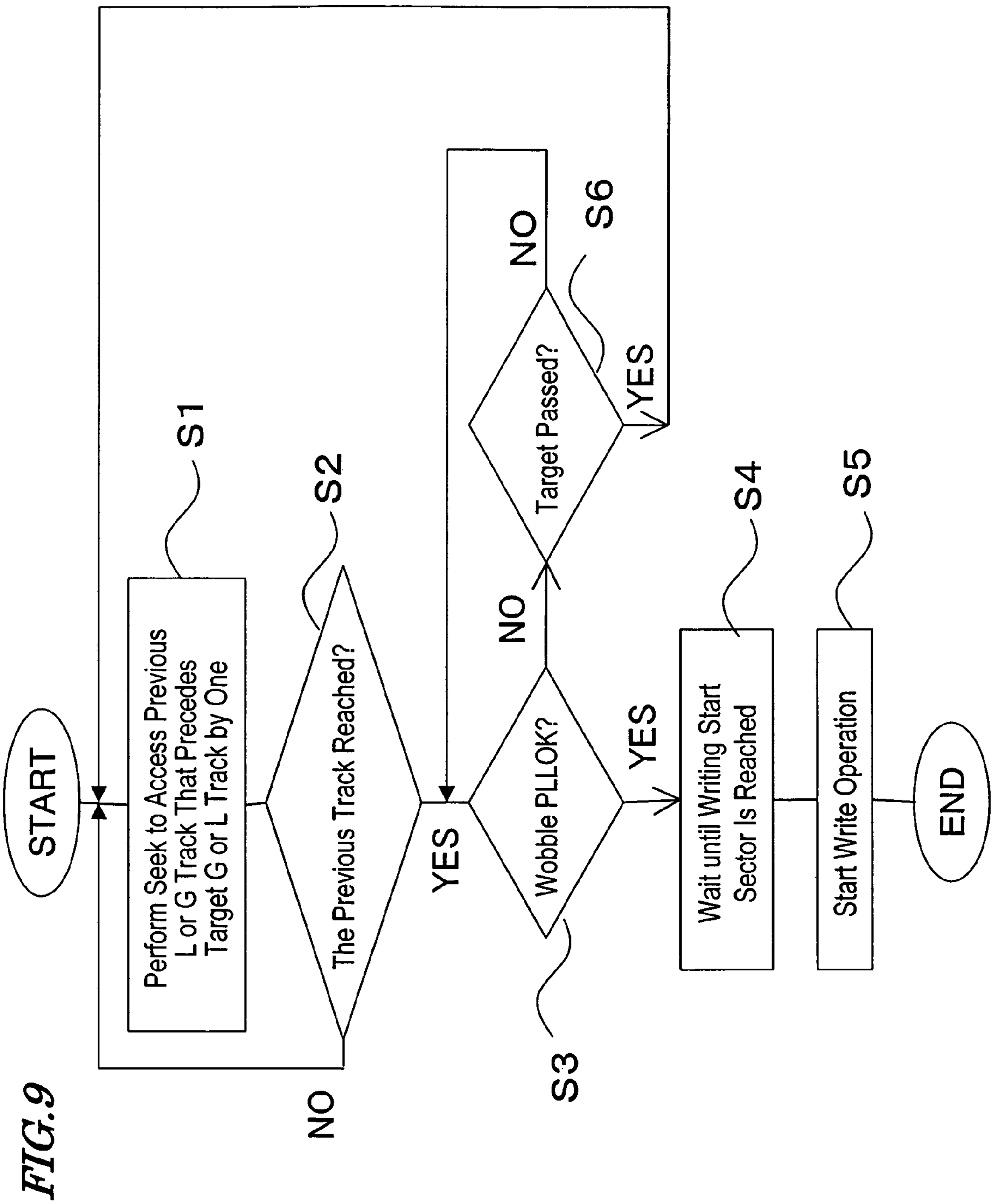

FIG. 9 is a flowchart showing how a write operation may be performed according to the first preferred embodiment.

Figure 10:
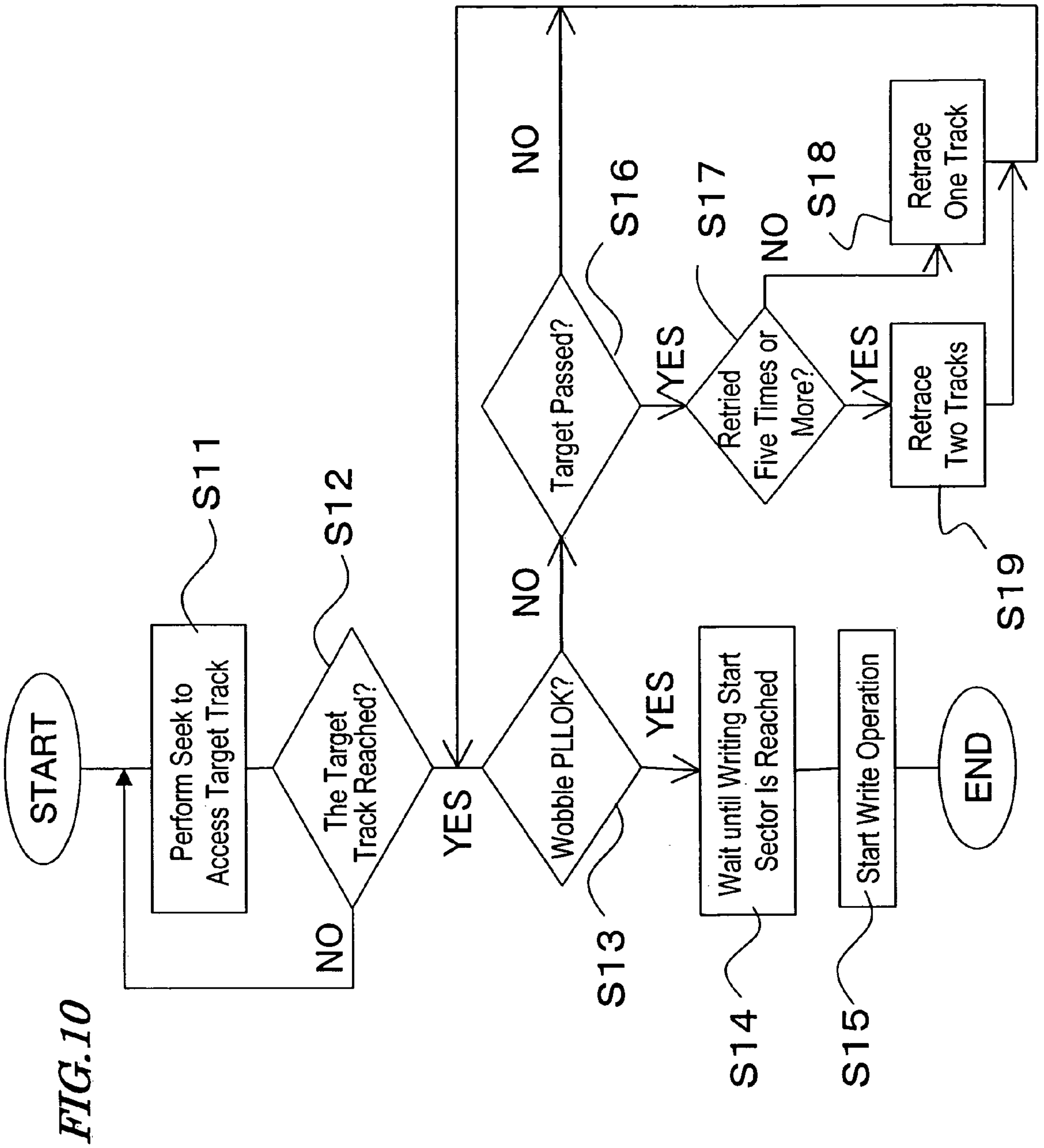

FIG. 10 is a flowchart showing how a write operation may be performed according to the first preferred embodiment.

Figure 11:
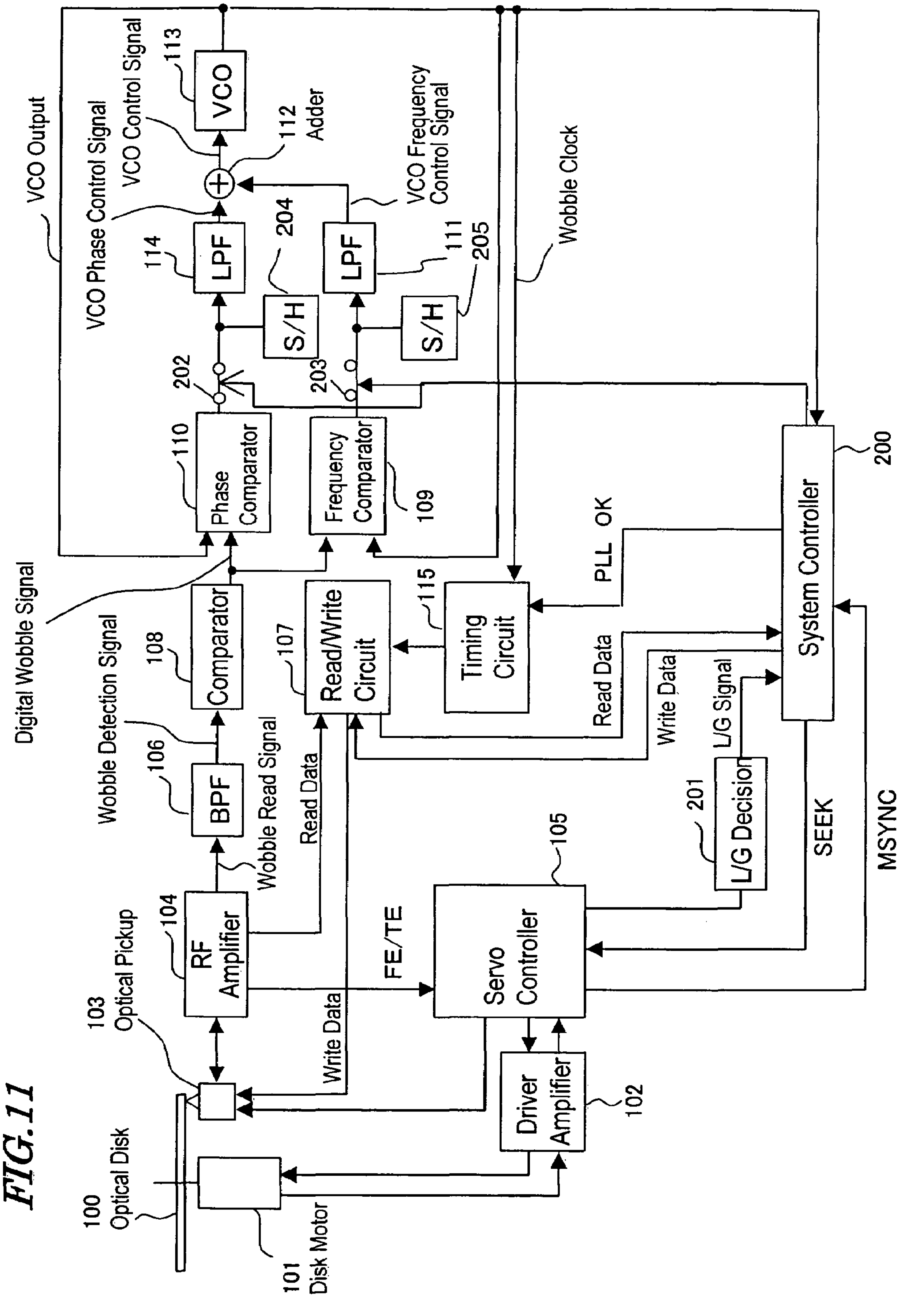

FIG. 11 is a block diagram showing a second specific preferred embodiment of an optical disk drive according to the present invention.

Figure 12:
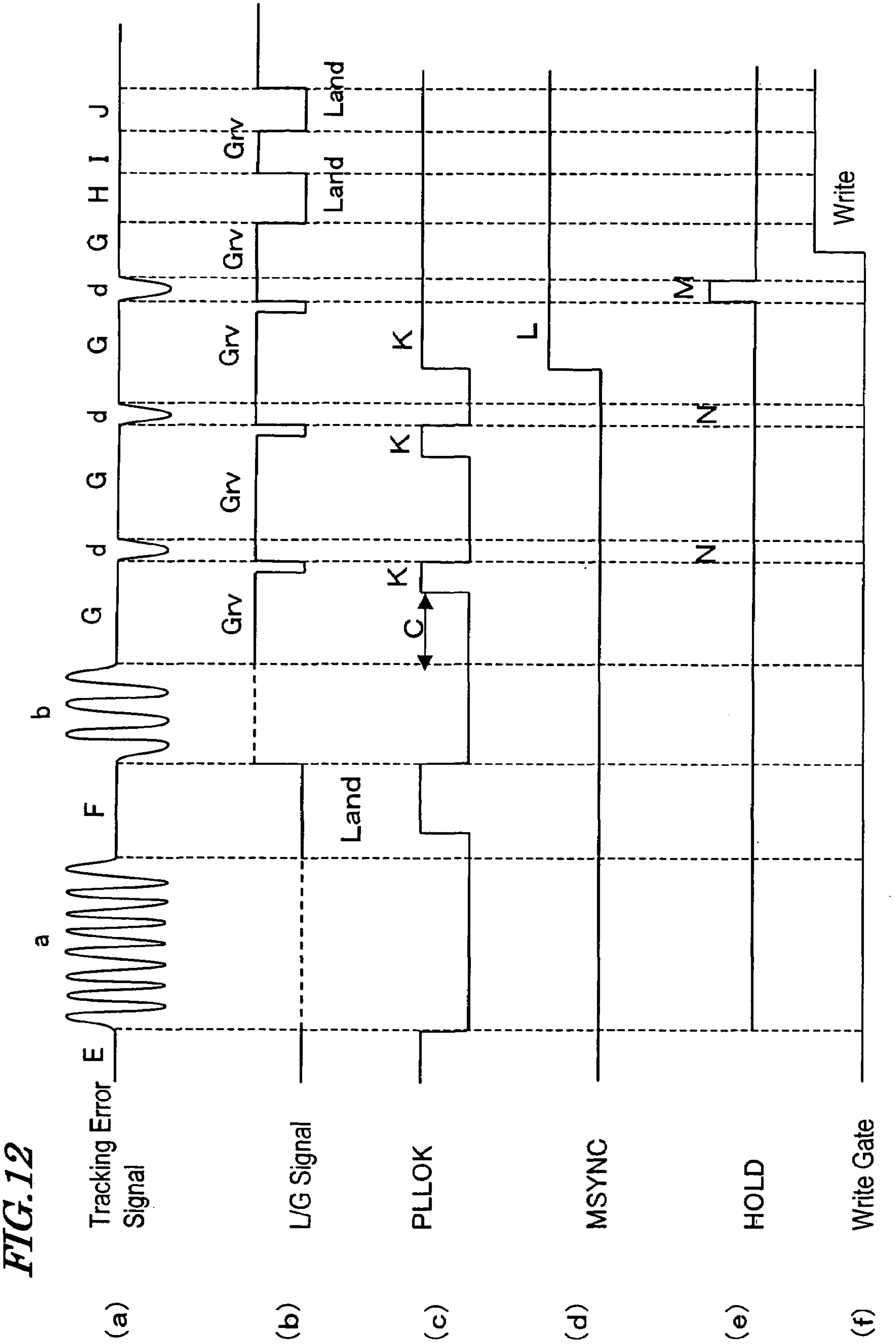

FIG. 12 shows the waveforms of respective signals used in the second preferred embodiment of the present invention, wherein:

Portions (e) through (f) of FIG. 12 show the waveforms of a TE signal, the output signal of the L/G decision section 201 (i.e., L/G signal), a PLLOK signal showing whether the PLL has got locked or not, an MSYNC signal indicating that the rotational velocity of the disk motor has reached a predetermined value, a HOLD signal and a write gate signal representing a write state, respectively.

DETAILED DESCRIPTION OF PREFERRED EMBODIMENTS

An optical disk drive according to a preferred embodiment of the present invention preferably uses an optical disk, including a spiral string of tracks where land tracks and groove tracks are alternated with each other, as a storage medium. Typical examples of such optical disks include a DVD-RAM and an HD-DVD.

As described above, while performing a seek operation such that a target track, where data should start being read or written from/on an optical disk with such a structure, is irradiated with a light beam, the wobble signal generated from the target track may have too low a quality to get a PLL locked. In that case, since land and groove tracks with different properties are arranged alternately, a wobble signal of high quality can be generated from a previous track that precedes the target track by one. According to a preferred embodiment of the present invention, by starting trying to get the PLL locked on another track, which precedes the target track by at least one, the PLL can get locked almost always before the beam spot reaches a reading or writing start point on the target track.

According to the present invention, the seek operation may be targeted on a track that precedes the target track by at least one. Alternatively, as in the prior art, the target of the seek operation may be set on the target track and only when the PLL cannot get locked quickly on the target track, the beam spot may be shifted back to a track that precedes the target track and the drive may retry to get the PLL locked on that track.

Embodiment 1

Hereinafter, a first specific preferred embodiment of an optical disk drive according to the present invention will be described with reference to the accompanying drawings.

Figures 1A, 1B, 1C, 1D:
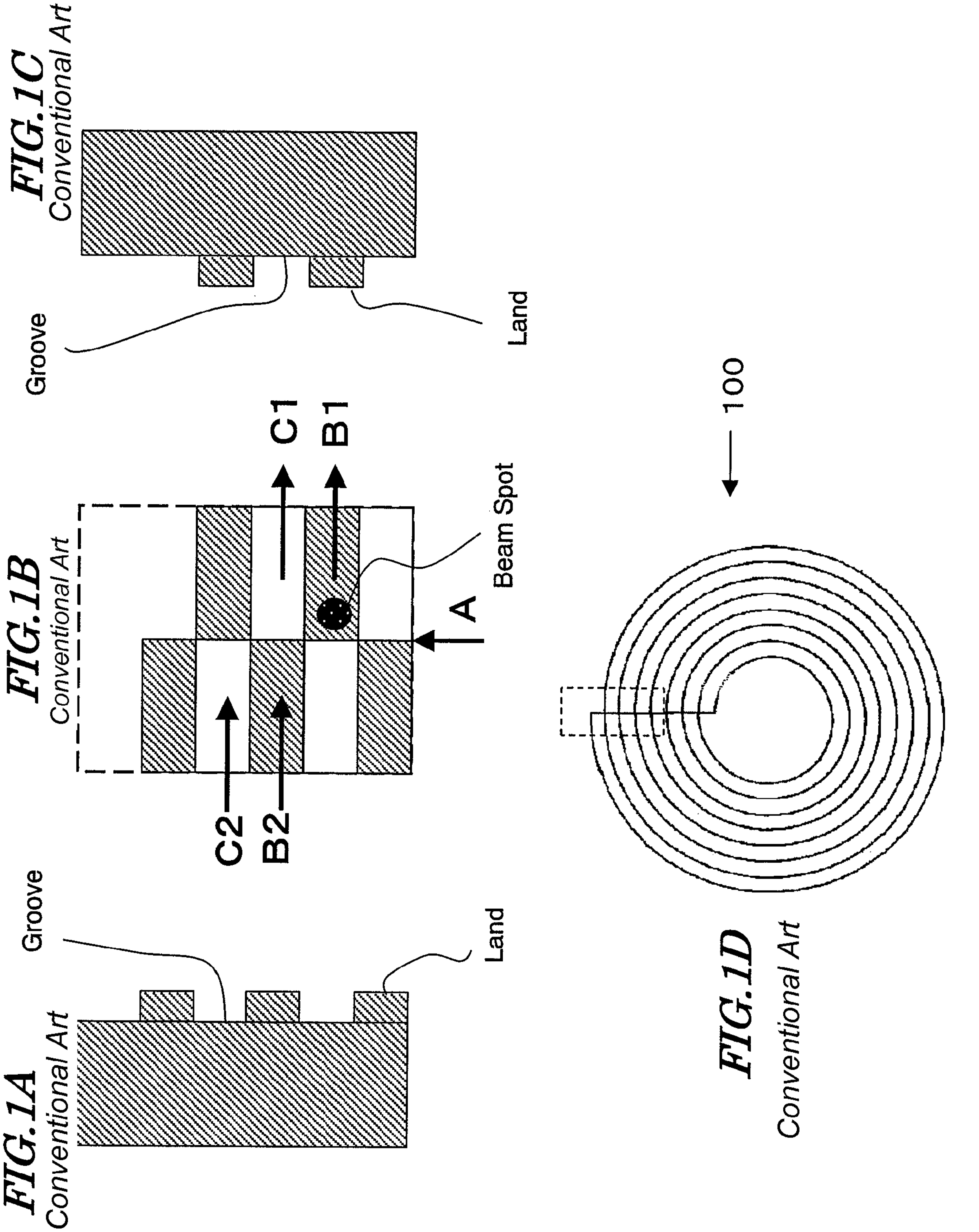
Figure 2A:
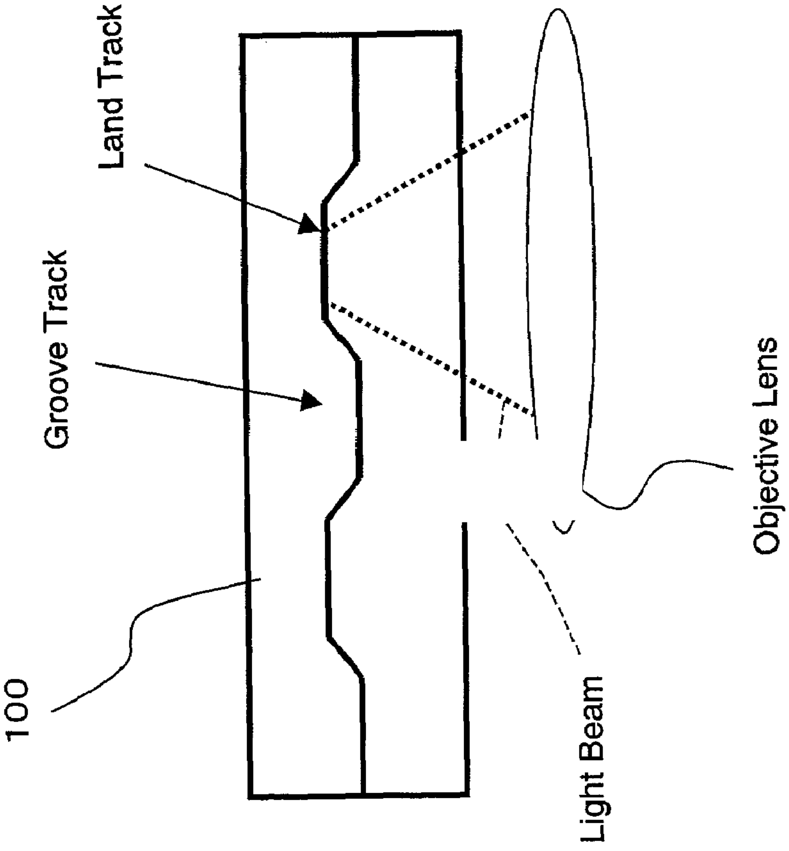
FIG. 2A is a cross-sectional view schematically illustrating how a light beam has been converged by an objective lens on a land track of the optical disk 100.
Figure 2B:
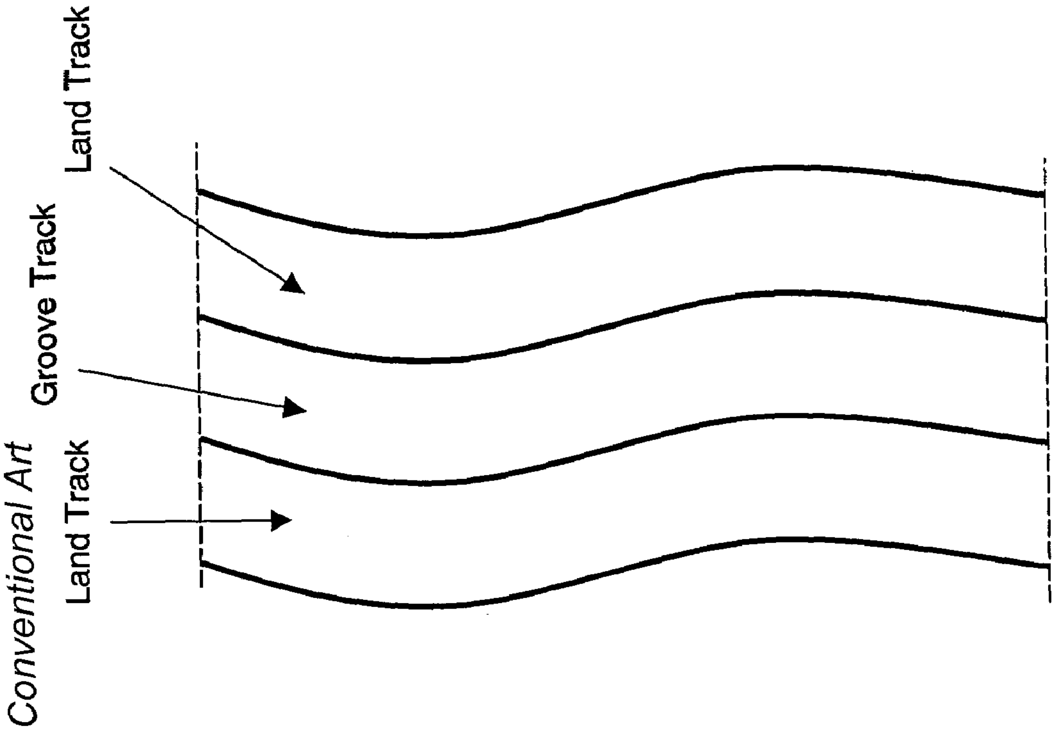
FIG. 2B is a plan view illustrating a portion of land/groove tracks.
Figure 3A:
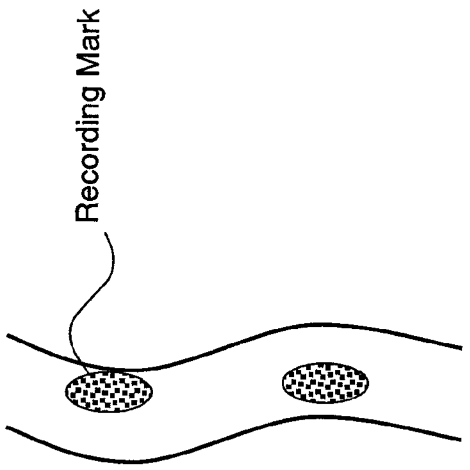
FIG. 3A is a plan view illustrating where recording marks are left on a land track when the L/G ratio is one.
Figure 3B:
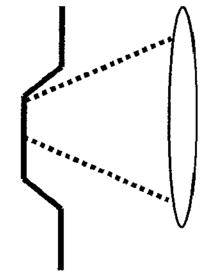
FIG. 3B is a cross-sectional view illustrating which portion of the track a light beam hits in such a situation.
Figure 3C:
FIG. 3C shows the waveform of a wobble signal that has been read from a land track with such recording marks.
Figure 4A:
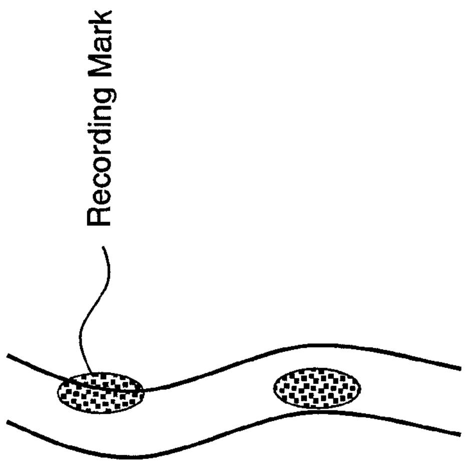
FIG. 4A is a plan view illustrating where recording marks are left on a land track when the L/G ratio is smaller than one.
Figure 4B:
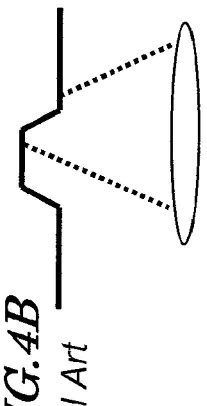
FIG. 4B is a cross-sectional view illustrating which portion of the track a light beam hits in such a situation.
Figure 4C:
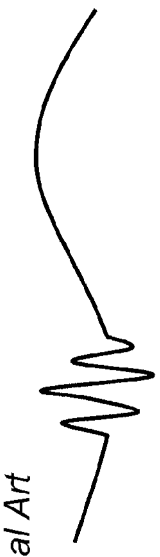
FIG. 4C shows the waveform of a wobble signal that has been read from a land track with such recording marks.
Figure 5:
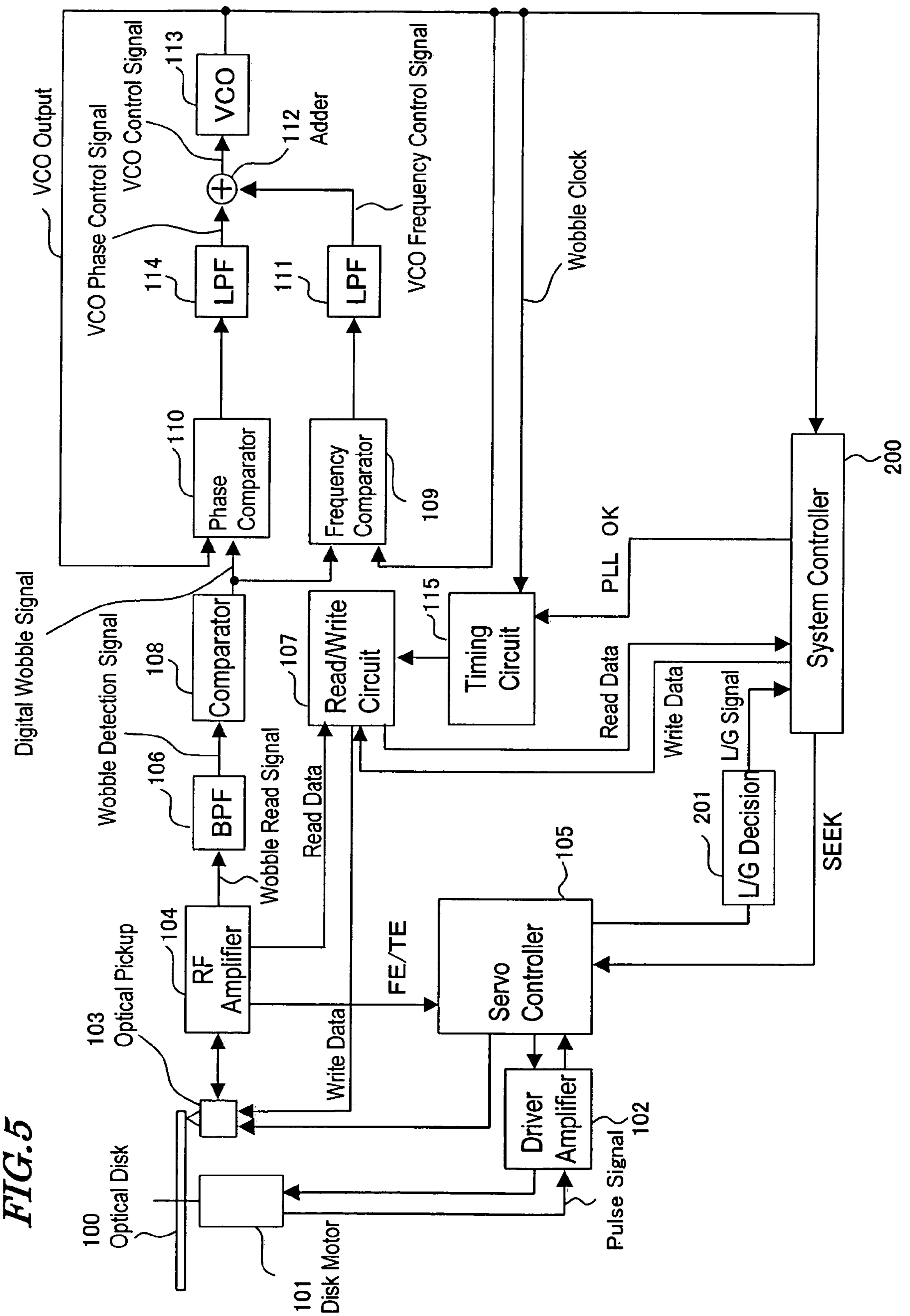
FIG. 5 is a block diagram showing a first specific preferred embodiment of an optical disk drive according to the present invention.

First, referring to FIG. 5, illustrated is a block diagram showing an arrangement according to this preferred embodiment. The optical disk 100 shown in FIG. 5 may be a DVD-RAM, on which a string of tracks is arranged spirally from its inner edge toward its outer edge. The structure of the optical disk 100 will be described more fully later. The optical disk 100 is turned by a disk motor 101. The disk motor 101 has its rotational velocity controlled by a driver amplifier 102 and outputs a pulse signal, representing the rotational velocity, to the driver amplifier 102.

An optical pickup 103 irradiates the rotating optical disk 100 with a light beam and detects the light beam, reflected from a track on the disk 100, with built-in photodiodes (i.e., a photodetector), for example, thereby generating an RF (radio frequency) signal. Also, the optical pickup 103 may also irradiate the optical disk 100 with a light beam, which has been modulated according to the data to be written, and thereby make recording marks thereon. The optical pickup 103 has the known configuration including a light source for radiating a light beam, an objective lens for converging the light beam, moving means (e.g., an actuator) for moving the lens, and a photodetector for generating an electrical signal based on at least a part of the light beam that has been reflected from the optical disk. None of these components is shown in FIG. 5.

An RF amplifier 104 amplifies the output RF signal of the optical pickup 103, subjects it to a waveform equalizing process, for example, and generates a focus error (FE) signal, a tracking error (TE) signal and other signals. The FE and TE signals are supplied to a server controller 105. Also, the RF amplifier 104 generates a wobble read signal from the RF signal and outputs the wobble read signal to a bandpass filter (BPF) 106. Furthermore, the RF amplifier 104 extracts read data from the RF signal that has been obtained from the optical disk 100 and outputs the read data to the read/write circuit 107.

The servo controller 105 compensates for the gains and phases of the FE and TE signals supplied from the RF amplifier 104 and drives an actuator (not shown) in the optical pickup 103, thereby carrying out a focus servo control and a tracking servo control on the optical pickup 103. Also, the servo controller 105 controls a sled mechanism (not shown), which is arranged to move the optical pickup 103 in the radial direction of the optical disk 100. Furthermore, the servo controller 105 compensates for the gain and phase of a pulse signal supplied from the disk motor 101 and gets a servo control operation done by the driver amplifier 102 such that the optical disk 100 rotates at a constant linear velocity (CLV).

The BPF 106 limits the frequencies of the wobble read signal, supplied from the RF amplifier 104, to a predetermined frequency range, and removes noise components from the wobble read signal and outputs a wobble detection signal to a comparator 108. In response, the comparator 108 digitizes the wobble detection signal supplied from the BPF 106 and outputs the digitized wobble signal (digital wobble signal) to a frequency comparator 109 and a phase comparator 110. The frequency comparator 109 receives the frequency of the digital wobble signal supplied from the comparator 108 and the output of the VCO 113 (which will be described in detail later) and compares them with each other, thereby outputting a signal representing their frequency difference to an adder 112 by way of a low pass filter (LPF) 111.

The phase comparator 110 compares the phase of the digital wobble signal that has been processed by the comparator 108 with that of the output of a VCO 113 and then outputs a phase error signal thus obtained to the adder 112 by way of another LPF 114. The adder 112 adds a VCO frequency control signal, supplied by way of the LPF 111, and a VCO phase control signal, supplied by way of the LPF 114, together, thereby generating a VCO control signal to control the VCO 113.

In response to the VCO control signal supplied from the adder 112, the VCO 113 oscillates and supplies its output (i.e., a PLL-locked wobble signal) to the frequency comparator 109, the phase comparator 110 and a timing circuit 115. The VCO 113 regulates the frequency of its own output so as to eliminate the frequency difference between the digital wobble signal input to the frequency comparator 109 and its own output. In the same way, the VCO 113 regulates the phase of its own output so as to eliminate the phase difference between the digital wobble signal input to the phase comparator 110 and its own output. As used herein, the "PLL-locked state" refers to a state in which the VCO output and the digital wobble signal have had their frequencies and phases matched with each other. When the PLL gets locked, the frequency and phase of the VCO output are stabilized. Then, by sensing that the VCO output has been stabilized and the PLL has been locked, the system controller 200 changes the levels of a PLLOK signal from "Low" into "High".

On receiving the PLLOK signal from the system controller 200, the timing, circuit 115 generates a timing signal for use to read the header data of a data signal, for example, based on the VCO output, i.e., the PLL-locked wobble signal (which may be a reference signal or a wobble clock signal), and outputs the timing signal to the read/write circuit 107. When the PLL gets locked in this manner, a wobble clock signal to be used as a reference clock signal in various operations is generated based on the wobble read signal. To present the read data in response to the RF signal supplied from the RF amplifier 104, the read/write circuit 107 outputs the read data to the system controller 200 including a digitizer, a demodulator and an error corrector (none of which is shown in FIG. 5). Also, on receiving write data, which should be written on the optical disk 100, from the system controller 200, the read/write circuit 107 processes the write data and then outputs the processed write data to the laser driver (not shown) in the optical pickup 103. In response, the laser driver controls the semiconductor laser (i.e., the light source) based on this write data.

In this preferred embodiment, the PLL includes a loop consisting of the frequency comparator 109, the LPF 111 and the VCO 113 and a loop consisting of the phase comparator 110, the LPF 114 and the VCO 113. Thanks to these functions of this PLL, a wobble clock signal is generated as a reference clock signal for various operations based on the wobble read signal that has been read by the optical pickup 103 from the optical disk 100.

Generally speaking, an optical disk drive performs a series of data read and write operations synchronously with a wobble signal. However, even before the rotational velocity of the optical disk 100 reaches predetermined rpm falling within a desired zone, the optical disk drive can also read and write data as long as the optical disk drive can keep the PLL synchronized with the wobble signal with good stability. That is why the optical disk drive usually sets the target of a seek operation on a predetermined land or groove track to read or write data therefrom or thereon, gets the PLL synchronized with a wobble signal obtained from the track, waits for the revolutions of the optical disk to settle and then starts writing the data from a desired sector. In contrast, according to this preferred embodiment, the target of the seek operation is not set on the target track, on which the read or write operation should be started, but on another track that precedes the target track by at least one (and preferably by one) as will be described in detail later.

An L/G decision section 201 determines, by the polarity (i.e., positive or negative) of the tracking error signal supplied from the servo controller 105, whether the target of the current tracking operation on the optical disk 100 is a land track or a groove track, thereby generating a polarity signal showing the result of this decision (which will be referred to herein as an "L/G signal").

A system controller 200 functions as a control section for the optical disk drive of the present invention. In starting a data read or write operation, the system controller 200 gets the sled mechanism (not shown) driven by the servo controller 105 and moves the optical pickup 103 such that the light beam is converged on the target track. The system controller 200 starts a seek operation to access the target track by sending a SEEK signal to the servo controller 105. After the light beam spot has reached the target track, the system controller 200 changes the levels of a write gate signal from Low into High. This signal is input to a laser driver (not shown). In response, the light source (e.g., a semiconductor laser) in the optical pickup 103 radiates a light beam toward the optical disk 100. The power of the light beam during this operation (i.e., the write power) is so much higher than that of the light beam during a data read operation that a recording mark can be made on the optical disk 100 using the light beam with the write power.

Figure 6A:
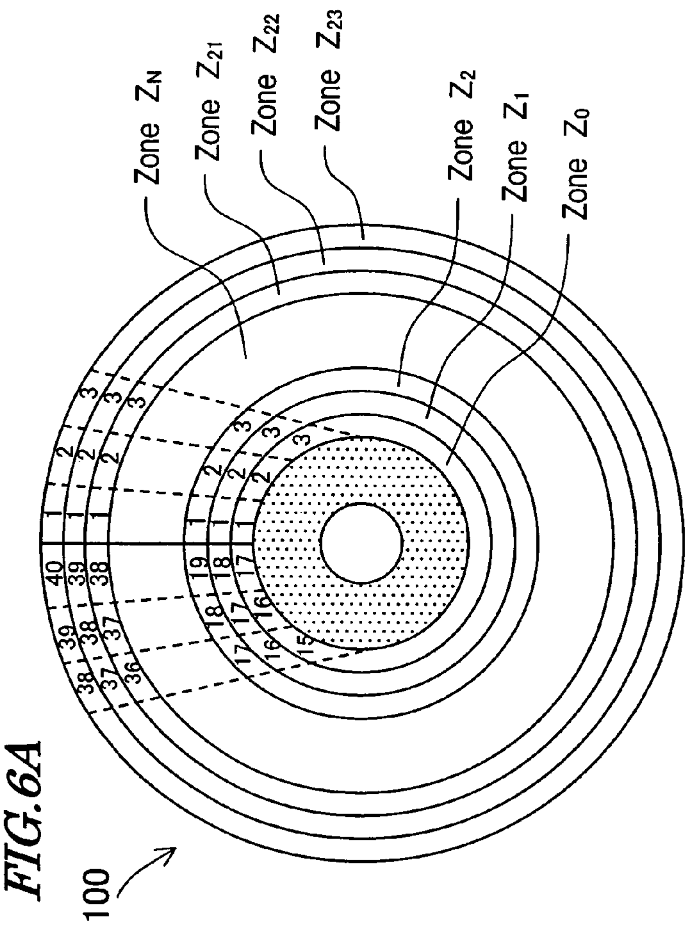
FIG. 6A is a plan view illustrating the entire optical disk and FIG. 6B schematically illustrates some tracks on the optical disk 100 on a larger scale.
Figure 6B:
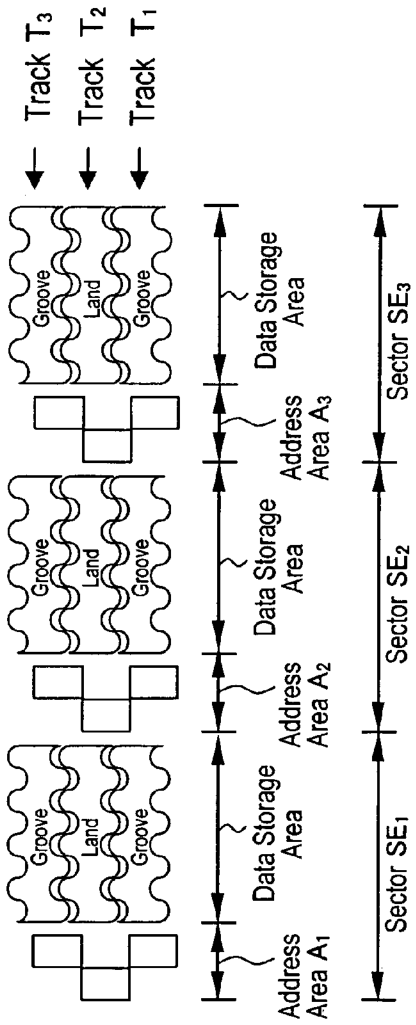

Next, the structure of the optical disk 100 will be described in further detail with reference to FIGS. 6A and 6B. FIG. 6A is a plan view illustrating the entire optical disk 100 and FIG. 6B schematically illustrates some tracks on the optical disk 100 on a larger scale.

As shown in FIG. 6A, the storage area of the optical disk 100 is divided into a plurality of concentric zones $Z_0$, $Z_1$, . . . and $Z_N$, each of which is subdivided into a plurality of sectors. The number of sectors included in each zone increases one by one from the inner edge toward the outer edge of the optical disk. Such a zone format is adopted to increase the storage capacity of the optical disk. This is because if the number of bits storable on a track increases as the zone of the track goes closer to the outer edge, then the length of a required area on the disk to read or write one bit of data (which will be referred to herein as a "pit length") will remain almost the same in any of those zones having mutually different circumferential lengths. Accordingly, the closer to the inner edge the zone on which the beam spot is currently located is, the higher the rotational velocity of the disk should be. In this manner, the lengths of bit signals are substantially equalized in all of those zones.

Furthermore, in each of those zones, its rotational velocity is controlled so as to be constant. In this manner, when one of those zones is accessed, the rotational velocity of the optical disk 100 may be adjusted adaptively depending on where the zone in problem is located and data may be read or written from/on one of the tracks in that zone. This technique is called a "zone constant linear velocity (Z-CLV)" method.

When the optical pickup 103 is being moved toward a target track on the optical disk 100 (i.e., while a seek operation is being performed), it is already known what zone the target track belongs to. Thus, the system controller 200 sets the rotational velocity of the optical disk 100 to a velocity associated with that zone.

FIG. 6B illustrates only three $T_1$, $T_2$ and $T_3$ of a number of tracks $T_1$, $T_2$ and so on included in a single zone. And each of those tracks $T_1$, $T_2$ and so on includes a plurality of sectors $SE_1$, $SE_2$, and so on.

A track that makes one round around the optical disk 100 is either a land track or a groove track. A track adjacent to a land track is a groove track, while a track adjacent to a groove track is a land track. As described above, the land tracks and groove tracks are arranged alternately from the center of the disk toward its outer edge, thereby forming a spiral string of tracks as a whole. Each one of those land and groove tracks that are arranged spirally and alternately is supposed herein to make one full track. That is to say, if a given point is shifted from a land track to the next track inward or outward (i.e., toward the inner edge or the outer edge of the disk), then the next track should be a groove track. As used herein, a track that is inwardly adjacent to a given track on a disk will be referred to herein as a "track that precedes the given track by one".

At the top of each of those sectors $SE_1$, $SE_2$, and so on, an address area $A_1$, $A_2$, etc., where neither a land track nor a groove track is present, is arranged. An address is recorded on each of these address areas by shifting the track either inward or outward by a half pitch. Such an address is called "CAPA". On each of those sectors $SE_1$, $SE_2$, and so on, the address is followed by the data stored on either a land track or a groove track.

Hereinafter, an operation that characterizes the optical disk drive of this preferred embodiment will be described with reference to FIG. 7.

FIG. 7 shows the waveforms of respective signals that are generated after a target track has started being sought by the system controller 200 and until data starts being written on that track. Specifically, portions (a), (b), (c) and (d) of FIG. 7 show the waveforms of a TE signal, the output signal of the L/G decision section 201 (i.e., L/G signal), a PLLOK signal indicating that the PLL has been locked, and a write gate signal representing a write state, respectively. Portion (e) of FIG. 7 schematically illustrates the unevenness created by the lands (L) and grooves (G) on the surface of the disk.

As shown in FIG. 7, the seek operation is carried out to access a land track B from a land track A. In this example, the seek operation has been performed so as to reach a groove track (which is identified by "−1" in FIG. 7) that precedes the target writing start track (i.e., the land track B) by one. Actually, however, a land track that precedes the land track B by nine has been reached accidentally due to the eccentricity of the optical disk during that seek operation.

In this preferred embodiment, the target of the seek operation is not set on the land track B but on its previous track (i.e., the track that precedes the land track B by one) because the wobble signal obtained from the land track B has a bad jitter due to the L/G ratio of less than one as described above. In that case, it will take a rather long time to get the PLL locked while the beam spot is located on the land track B. And when the PLL is locked successfully, the beam spot may have already passed the sector where the write operation should be started. If the beam spot has gone over the target sector in this manner, a track jump is made in the prior art from a groove track, which is one track closer to the outer edge than the land track B is, to the land track B for retracing purposes. However, it is hard to get the PLL locked while the beam spot is located on the land track B due to its narrow track width, for example.

Accordingly, it will also take a lot of time to try to get the PLL locked again and the beam spot is quite likely to pass the target sector again.

In the example shown in FIG. 7, a groove track, which precedes the land track B by nine, has been reached once, but by getting the PLL locked on that groove track, the physical address of that track is read to make sure that the beam spot is not currently located on the target land track B. Thereafter, by making another track jump (which is sometimes called a "seeking jump"), the beam spot is shifted to another groove track, which precedes the land track B by three, this time. On this groove track, the PLL also gets locked and the physical address of that track is also read to make sure that the beam spot is still not located on the target land track B. And then a track jump is made one more time to eventually reach the groove track (−1) that precedes the land track B by one.

As described above, the optical disk 100 has the structure shown in FIGS. 1A through 1D. That is why if the beam spot is shifted along the groove track that precedes the land track B by one, then the beam spot will soon pass the boundary pointed by the arrow A in FIG. 1B to reach the target writing start track (i.e., the land track B). That is to say, after the PLL has got locked on the previous groove track, the tracking is continued without making any track jump to reach the land track B soon. Thereafter, when the target sector is reached on the land track B, the write gate is activated to start writing data thereon.

In this example, the seek operation is continued until the groove track that precedes the target land track B by one is reached and the PLL gets locked there. Thus, it is possible to avoid an unwanted situation where the beam spot has gone over the target sector on the land track B before the PLL gets locked successfully.

Portions (a) through (e) of FIG. 8 correspond to portions (a) through (e) of FIG. 7 and show a situation where a seek operation is supposed to be carried out to access a land track D from a groove track C. In this example, the beam spot has shifted to a track that is five track closer to the outer edge than the target land track D is during the seek operation. Thus, a track jump is made toward the inner edge of the disk so as to access the groove track (−1). However, the beam spot happens to reach the target writing start track (i.e., land track D). Nevertheless, the PLL cannot get locked while the beam spot is located on this land track D. And the beam spot reaches the next groove track (+1), where the PLL gets locked successfully. Thereafter, the beam spot jumps two tracks toward the inner edge of the disk so as to access the groove track (−1) that precedes the target land track D by one. Then, by keeping the tracking control ON while the beam spot is located on the groove track (−1), the PLL gets locked and the tracking is continued without making any track jump. And then the beam spot soon reaches the land track D. When the target sector is reached on the land track D, the write gate is activated to start writing data thereon.

In the example shown in FIG. 8, the PLL also gets locked on the groove track (D−1) that precedes the target land track D by one. Consequently, it is possible to avoid almost completely the unwanted situation where the target sector on the land track D is passed before the PLL gets locked successfully.

According to the preferred embodiment described above, the seek operation is carried out so as to access a groove track that precedes the target land track by one. In this case, since the groove track generates a signal with relatively little jitter, the PLL can get locked in a shorter time and with more certainty. Also, according to this preferred embodiment, even if no track jump is made after the PLL has got locked, the beam spot will shift smoothly from the groove track toward the land track, which is located one track closer to the outer edge than the groove track is, as the optical disk rotates. Thus, when the target sector is reached, the data can start being written by activating the write gate.

It should be noted that the L/G ratio may sometimes be equal to one and a wobble signal generated from a land track and that generated from a groove track may have similar degrees of jitter in many cases. Also, when data is written for the first time on an unrecorded optical disk, no wobble signals are affected by recording marks. In those situations (e.g., when data is written for the first time), the target track may be accessed directly.

Alternatively, it is not until the retry operation has been carried out more than five times, for example, after the PLL could not get locked that the beam spot may be retraced to that track preceding the target track by one. In that case, when this optical disk drive processes a normal optical disk, the access performance will not decline. And the optical disk drive can perform the read/write operation with good stability when handling an optical disk that generates wobble signals of various qualities from land and groove tracks.

Hereinafter, the basic processing flow of the seek and PLL locking operations of this preferred embodiment will be described with reference to FIG. 9.

First, in Step S1, a seek operation is carried out to access a track that precedes a target track by one (which will be referred to herein as the "previous track"). Next, in Step S2, it is determined whether or not the previous track has been reached. In the examples shown in FIGS. 7 and 8, the PLL gets locked and the address is read on another track before the previous track is reached, but eventually the PLL gets locked on the previous track, too.

If the answer to the query of Step S2 is YES (i.e., if it has been determined in Step S2 that the previous track has been reached), the drive starts trying to get the PLL locked by reference to a wobble signal generated from that previous track, and it is determined in Step S3 whether or not the PLL has got locked successfully. If the answer is YES (i.e., if the PLL has got locked (PLLOK)), the process advances to Step S4, in which the optical disk drive waits until the writing start sector on the target track is reached. And when the writing start sector is reached as the optical disk rotates, the write operation is started in Step S5.

Meanwhile, if the answer to the query of Step S3 is NO (i.e., if it has been determined in Step S3 that the PLL has not got locked yet), then the process advances to Step S6, in which it is determined whether or not the writing start sector (i.e., the target) has been passed. If the answer is YES, then the process returns to Step S1. After that, the previous track is sought and the same processing steps are carried out again. On the other hand, if the answer to the query of Step S6 is NO (i.e., if it has been determined in Step S6 that the writing start sector has not been passed yet), then the drive continues trying to get the PLL locked. And if it is determined in Step S6 that the target has already been passed but if the PLLOK signal is still not generated before the target is passed even though the operation of going back to the preceding track has been performed a predetermined number of times, then "error" is indicated and the read or write operation is stopped.

In the processing flow shown in FIG. 9, the target of the seek operation is set on the track that precedes the target track by one. However, the target of the seek operation may also be set on the target track in some situations.

Alternatively, it is not until the retry operation has been carried out more than five times, for example, after the PLL could not get locked that the beam spot may be retraced to that track preceding the target track by one. In that case, when this optical disk drive processes a normal optical disk, the access performance will not decline. And the optical disk drive can perform the read/write operation with good stability when handling an optical disk that generates wobble signals of various qualities from land and groove tracks.

Hereinafter, a processing flow to be adopted in a situation where the target of the seek operation is set on the target track will be described with reference to FIG. 10.

In this example, first, a seek operation is carried out in Step S11 so as to access the target track. Next, in Step S12, it is determined whether the target track has been reached or not. If the answer is YES (i.e., if it has been determined in Step S12 that the target track has already been reached), the drive starts trying to get the PLL locked by reference to a wobble signal generated from the target track, and it is determined in Step S13 whether or not the PLL has got locked successfully. If the answer is YES (i.e., if the PLL has got locked (PLLOK)), the process advances to Step S14, in which the optical disk drive waits until the writing start sector is reached. And when the writing start sector is reached, the write operation is started in Step S15.

Meanwhile, if the answer to the query of Step S13 is NO (i.e., if it has been determined in Step S13 that the PLL has not got locked yet), then the process advances to Step S16, in which it is determined whether or not the writing start sector has been passed. If the answer is YES, then it is determined in Step S17 whether or not the retry operation has been carried out five times or more. If the answer is NO (i.e., if the retry operation has been carried out less than five times), the process advances to Step S18, in which the beam spot is retraced to the previous track (i.e., the target track itself), and then returns to Step S13. And the retry operation is carried out once again to try to get the PLL locked.

If the writing start sector has been passed before the PLL gets locked on the target track, then the process advances to Step S17 again. In Step S17, if it has been determined that the retry operation has been carried out less than five times, then the beam spot is retraced by one to the target track. But if the PLL gets locked successfully while the retry operation is repeatedly performed, then Steps S13, S14 and S15 are performed.

If it has been determined in Step S17 that the retry operation has already been carried out five times or more, then the process advances to Step S19. In that case, after the target track has been passed, the beam spot is retraced by two tracks (i.e., to the track that precedes the target track by one). In this example, it is not until the PLL cannot get locked even after the normal retry operation has been carried out five times on the target track that the beam spot is retraced to the track that precedes the target track by one and the drive tries to get the PLL locked one more time. That is to say, the processing flow shown in FIG. 10 is different from that shown in FIG. 9 in that the drive retries to get the PLL locked on the previous track if the PLL could not get locked a predetermined number of times on the target track due to some problem.

Alternatively, instead of trying to get the PLL locked on the track preceding the target track by one, the drive may attempt to get the PLL locked more than two tracks before the target track. To get the PLL locked as quickly as possible, however, it is preferable to try to get the PLL locked on the previous track.

Embodiment 2

Hereinafter, an optical disk drive according to a second specific preferred embodiment of the present invention will be described with reference to FIG. 11. In FIG. 11, each component of the optical disk drive of this preferred embodiment, having the same function as the counterpart of the optical disk drive of the first preferred embodiment described above, is identified by the same reference numeral and the description thereof will be omitted herein. The configuration of this preferred embodiment is basically the same as that of the first preferred embodiment except the following respects:

A switch 202 and a sample-and-hold circuit 204 are inserted between the phase comparator 110 and the LPF 114, and a switch 203 and a sample-and-hold circuit 205 are inserted between the frequency comparator 109 and the LPF 111;

The system controller 200 can hold the respective outputs of the phase comparator 110 and the frequency comparator 109 by supplying a HOLD signal thereto, and therefore, can maintain the VCO control signal at a constant value; and The rotation pulse of the disk motor 101 is input to the servo controller 105 by way of the driver amplifier 102, thereby determining whether or not the rotational velocity of the disk motor 101 has reached a predetermined value when the beam spot reaches the next zone after the seek operation has finished. If the answer is YES, then the servo controller 105 outputs an MSYNC signal to the system controller 200. Even before the rotational velocity of the optical disk 100 reaches the predetermined velocity, a series of data read and write operations can be carried out as long as the wobble signal, contributing to holding the PLL locked, is being output constantly. If the rotational velocity of the disk motor 101 has not reached the predetermined value yet, however, the PLL locked by the wobble signal may lose its stability.

Hereinafter, it will be described with reference to FIG. 12 how to get a PLL locked according to this preferred embodiment after the seek operation has finished. Portions (a) through (f) of FIG. 12 show the waveforms of a TE signal, an L/G signal, a PLLOK signal, an MSYNC signal indicating that the rotational velocity of the disk motor has reached a predetermined value, a PLL HOLD signal and a write gate signal, respectively, in a situation where the system controller 200 seeks a target track to write data on.

In the example shown in FIG. 12, the seek operation is supposed to be carried out so as to access a groove track G from a land track E. Actually, however, the beam spot once reaches a land track F, which precedes the groove track G, due to an error such as eccentricity. After that, a track jump (jumping seek) b of six tracks is made so as to access the groove track G. As a result of this jumping seek b, the groove track G, which is the target writing start track, is reached. But the wobble read signal obtained from this track has a bad jitter, thus causing a significant delay before the PLL gets locked. In FIG. 12, the period pointed by the arrow C indicates the PLL locking delay.

Since it has taken a rather long time to get the PLL locked, the target sector has already been passed. That is why a jump d of one track is made again, thereby retracing the beam spot to the writing start track G. In this example, the target track is reached as a result of the jump d for retracing purposes. However, the rotational velocity of the disk motor 101 has not yet reached a predetermined velocity defined for the zone to which the target track belongs (i.e., MSYNC=0). As a result, the system controller 200 does not output the HOLD signal to the switches 202 and 203 but makes the retracing jump d again.

In this example, since the PLL has got locked on the track G after a significant delay, the target sector has already been passed before the PLLOK signal is output. That is why the retracing jump d is made while the PLL control loop is not held (as indicated by N in FIG. 12). Unless this jump d is made, the beam spot will go toward a land track H that follows the target track G. Since the retracing jump d is made without holding the PLL locked, the PLL gets unlocked and the PLLOK signal changes from High level into Low level.

However, when the predetermined amount of time passes, the rotational velocity of the disk motor 100 finally reaches the predetermined velocity. As a result, the MSYNC signal changes from Low level into High level as indicated by L in FIG. 12. In that case, the drive retries to get the PLL locked one more time on the target track G, the beam spot is shifted to the next track H, and then a retracing jump is made when the HOLD signal is output as indicated by M in FIG. 12 (i.e., while holding the PLL locked).

As described above, as long as the disk motor is rotating at a predetermined velocity, the PLL never loses its stability even if the beam spot is retraced by a track or two while holding the PLL locked. That is to say, the retracing jump can be made toward the target track while the PLL is held locked. As a result, the write operation on the target sector can be started quickly.

According to the second preferred embodiment described above, even if a significant delay has been caused before the PLL gets locked, the read or write operation can be started just as intended, thus realizing stabilized access performance and write operation.

In the preferred embodiments described above, an optical disk, which was manufactured to the specifications of a DVD-RAM and designed in the Z-CLV format, is adopted. However, the present invention is in no way limited to those specific preferred embodiments. Alternatively, the present invention is also applicable to an optical disk that was simply designed in the CLV or CAV format. Also, in the preferred embodiments described above, an optical disk on which addresses are recorded by the CAPA method is used. However, the present invention is also applicable to a different type of optical disk, e.g., a DVD±LR or a DVD±RW on which address information is stored as all or a part of a wobble track itself. Furthermore, the present invention also achieves beneficial effects even when applied to an HD-DVD on which data is stored on lands and grooves as in a DVD-RAM.

Also, the optical disk, from/on which data is read or written by the optical disk drive of the present invention, may have either a single-sided multilayer structure including multiple information storage layers (each including a data area and a management area for managing the data area) on a single side of the substrate or a double-sided structure including a single or multiple layers on both sides of the substrate. Furthermore, no matter how many information storage layers are included, the storage density thereof may also be defined arbitrarily.

According to the present invention, even when handling a DVD-RAM, an HD-DVD or any other optical disk on which data can be written on both land tracks and groove tracks, the PLL can get locked just as intended. Consequently, the present invention contributes to improving the performance of optical disk drives.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2004-328745 filed Nov. 12, 2004 and No. 2005-323240 filed Nov. 8, 2005, the entire contents of which are hereby incorporated by reference.

What is claimed is:

1. An optical disk drive for reading and/or writing data from/on a spiral string of tracks having alternating land and groove tracks with a ratio (L/G) of a width (L) of a land track to a width (G) of a groove track being not equal to one, the optical disk drive comprising:

a light source for radiating a light beam;

a lens for converging the light beam;

moving means for moving the lens;

a photodetector for generating an electrical signal based on at least a part of the light beam that has been reflected from the optical disk; and a control section for controlling the light source and the moving means, wherein while performing a seek operation by having the lens moved by the moving means such that a target track, where the data should start being read or written from/on the optical disk, is irradiated with the light beam, the control section tries to get a PLL locked by irradiating a previous track, which precedes the target track by one on the spiral string, with the light beam, wherein if the target track is one of the land tracks, the control section tries to get a PLL locked by irradiating a previous groove track, which precedes the target track by one on the spiral string, with the light beam, and if the target track is one of the groove tracks, the control section tries to get a PLL locked by irradiating a previous land track, which precedes the target track by one on the spiral string, with the light beam, and wherein if the ratio (L/G) is less than one, then the PLL is locked while a beam spot of the light beam moves on the groove track, regardless of whether the target track is one of the land tracks or one of the groove tracks.

2. The optical disk drive of claim 1, wherein if the control section has tried to get the PLL locked a predetermined number of times by irradiating the target track with the light beam but has failed to start reading or writing the data from/on the target track, the control section tries to get the PLL locked by irradiating the previous track with the light beam.

3. The optical disk drive of claim 2, wherein after having started trying to get the PLL locked by irradiating the previous track with the light beam, the control section follows the spiral string of tracks without making any track jump, reaches the target track, and then begins to read or write the data from/on the target track.

4. The optical disk drive of claim 2, wherein if a writing start point on the target track has been passed before the PLL gets locked, then the control section goes back to either the target track or another track, which precedes the target track by one, to try to get the PLL locked all over again.

5. The optical disk drive of claim 1, wherein after having started trying to get the PLL locked by irradiating the previous track with the light beam, the control section follows the spiral string of tracks without making any track jump, reaches the target track, and then begins to read or write the data from/on the target track.

6. The optical disk drive of claim 1, wherein the optical disk is a DVD-RAM or an HD-DVD.

7. The optical disk drive of claim 1, wherein a ratio (L/G) of a width (L) of a land track to a width (G) of a groove track is set to be smaller than one.

8. A method for driving an optical disk drive, the optical disk drive reading and/or writing data from/on a spiral string of tracks having alternating land and groove tracks with a ratio (L/G) of a width (L) of a land track to a width (G) of a groove track being not equal to one, the method comprising the steps of:

performing a seek operation to irradiate a target track, where the data should start being read or written from/on the optical disk, with a light beam;

trying to get a PLL locked on a previous track, which precedes the target track by one on the spiral string; and after having started trying to get the PLL locked on the previous track, following the spiral string of tracks without making any track jump, reaching the target track, and then beginning to read or write the data from/on the target track, wherein if the ratio (L/G) is less than one, then the PLL is locked while a beam spot of the light beam moves on the groove track, regardless of whether the target track is one of the land tracks or one of the groove tracks.

9. The method of claim 8, further comprising the step of trying to get the PLL locked on the target track before the step of trying to get the PLL locked on the previous track is performed, wherein if the step of trying to get the PLL locked on the target track has failed a predetermined number of times, the step of trying to get the PLL locked on the previous track is carried out.

* * * * *